United States Patent [19]

Kobari et al.

[11] Patent Number: 4,973,294

[45] Date of Patent: Nov. 27, 1990

[54] LIMITED-SLIP DIFFERENTIAL CONTROL SYSTEM

[75] Inventors: Yuji Kobari; Takashi Imaseki, both of Zushi, Japan

[73] Assignee: Nissan Motor Co., Ltd., Yokohama, Japan

[21] Appl. No.: 259,659

[22] Filed: Oct. 19, 1988

[30] Foreign Application Priority Data

Oct. 20, 1987 [JP] Japan ............................... 62-264525

[51] Int. Cl.$^5$ ............................................. F16H 1/44
[52] U.S. Cl. ....................................... 475/150; 475/84; 475/231; 475/249
[58] Field of Search ................... 74/711, 710.5, 710; 364/424.01, 424.05; 475/150, 231, 249, 84; 180/233, 247

[56] References Cited

U.S. PATENT DOCUMENTS

| | | | |
|---|---|---|---|
| 4,156,547 | 5/1979 | Marsh | 74/711 X |
| 4,473,143 | 9/1984 | Windsor | 192/0.052 |
| 4,497,397 | 2/1985 | Windsor et al. | 192/0.076 |
| 4,511,014 | 4/1985 | Makita | 180/233 |
| 4,558,414 | 12/1985 | Sakakiyama | 364/424.1 |
| 4,558,772 | 12/1985 | Grimes et al. | 192/0.075 |
| 4,566,554 | 1/1986 | Suzuki | 180/249 |
| 4,609,064 | 9/1986 | Suzuki et al. | 180/233 |
| 4,633,735 | 1/1987 | Sakurai et al. | 74/675 |
| 4,671,373 | 6/1987 | Sigl | 74/711 X |
| 4,678,056 | 7/1987 | Kobari et al. | 180/247 |
| 4,679,463 | 7/1987 | Ozaki et al. | 74/711 |
| 4,681,180 | 7/1987 | Oyama et al. | 74/711 X |
| 4,727,966 | 3/1988 | Hiramatsu et al. | 74/711 X |
| 4,754,834 | 7/1988 | Ozaki et al. | 180/233 |
| 4,768,796 | 9/1988 | Tashiro et al. | 74/711 X |
| 4,773,012 | 9/1988 | Ito et al. | 364/424.01 |
| 4,790,404 | 12/1988 | Naito | 74/710.5 X |
| 4,805,486 | 2/1989 | Hagiwara et al. | 74/710.5 |
| 4,821,601 | 4/1989 | Ouchi | 74/710.5 X |

FOREIGN PATENT DOCUMENTS

| | | |
|---|---|---|
| 43237 | 1/1982 | European Pat. Off. . |
| 182312 | 5/1986 | European Pat. Off. . |
| 0189556 | 8/1986 | European Pat. Off. ............. 74/711 |
| 247820 | 12/1987 | European Pat. Off. . |
| 2434969 | 3/1980 | France . |
| 2609137 | 7/1988 | France . |
| 63-71428 | 3/1963 | Japan . |
| 61-67629 | 4/1986 | Japan . |
| 61-102320 | 5/1986 | Japan . |
| 0132420 | 6/1986 | Japan ................... 74/711 |
| 62-241732 | 10/1987 | Japan . |
| 700355 | 12/1977 | U.S.S.R. . |
| 1120132 | 9/1982 | U.S.S.R. . |
| 1110967 | 8/1984 | U.S.S.R. . |
| 2102907 | 2/1983 | United Kingdom . |
| 2104178 | 3/1983 | United Kingdom . |

Primary Examiner—Dwight Diehl
Attorney, Agent, or Firm—Foley & Lardner, Schwartz, Jeffery, Schwaab, Mack, Blumenthal & Evans

[57] ABSTRACT

A control system for controlling a differential limiting force of a limited slip differential of a vehicle includes a section for sensing a turning radius of the vehicle, a section for sensing centripetal acceleration of the vehicle, and a controller section. The controller section increases an engagement force of a differential limiting clutch of the limited slip differential in accordance with the turning radius and the centripetal acceleration.

9 Claims, 5 Drawing Sheets

LIMITED-SLIP DIFFERENTIAL CONTROL SYSTEM

REFERENCES TO RELATED APPLICATIONS

The following, commonly assigned, U.S. patent applications relate to limited-slip differentials. (1) U.S. Pat. No. 4,679,463, (2) Ser. No. 07/247,466, corresponding to Japanese patent application No. 62-245685, (3) Ser. No. 07/247,464 corresponding to Japanese patent application No. 62-245,684 (4) Ser. No. 07/267,602 corresponding to Japanese utility model applications Nos. 62-184485 and 62-169964, (5) Ser. No. 07/256,518 corresponding to Japanese patent applications Nos. 62-259038 and 62-312489, (6) Ser. No. 07/251,169, corresponding to Japanese patent application No. 62-249200, (7) Ser. No. 07/255,934, corresponding to Japanese patent application No. 62-255747.

BACKGROUND OF THE INVENTION

The present invention relates to a differential limiting force control system for controlling a differential limiting force for limiting a differential action between right and left drive wheels of a vehicle by controlling an engagement force of a differential limiting clutch of a limited slip differential. More specifically, the present invention relates to a differential limiting force control system responsive to a turning radius and a centripetal acceleration of a vehicle.

Japanese patent provisional publication No. 61-67629 discloses one conventional example. A control system of this example is arranged to increase an engagement force of a differential limiting clutch as the vehicle speed increases. Japanese patent provisional publication No. 61-102321 discloses another conventional control system, which is arranged to sense an accelerating condition of a vehicle, and to increase a clutch engagement force of a differential limiting clutch in rapid acceleration.

However, these conventional control systems have a disadvantage in that the clutch engagement force is controlled in accordance with only the vehicle speed, or the condition of acceleration. If control characteristics are adapted to a high friction coefficient road condition so that the clutch engagement is made relatively strong, then these conventional systems tend to cause rear end swing of the vehicle by a steep increase of the differential limting force during driving on a low friction coefficient road surface, and produce strong understeer at the time of "turn-in" during turn at a tight corner on a road surface of a low friction coefficient. If the control characteristics are adapted to a low friction coefficient road condition by making the clutch engagement force relatively weak, then the differential limiting force becomes so low during driving on a high friction coefficient road surface, that spin of an inside wheel of the turn is increased significantly, and the ability of acceleration during a turn is degraded.

It is possible to adjust the control characteristics in accordance with the friction coefficient of a road surface. However, it is difficult to accurately sense the friction coefficient.

Japanese patent application No. 61-217654, first publication number 63-71428, proposes a control system using a centripetal acceleration to adjust control based on the vehicle speed and accelerating condition in such a manner that the differential limiting force is increased as the centripetal acceleration increases. However, this control system is still disadvantageous in the following points. In a high speed straight ahead operation, the vehicle speed is high but the centripetal acceleration is low. In such a situation, the differential limiting force is insufficient, so that the stability against side wind is poor. This system decreases the differential limiting force almost to zero in a low speed straight ahead operation. Therefore, this system tends to produce spin during driving on a split mu (friction coefficient) road having different friction coefficients between a contact surface of the left wheels and a contact surface of the right wheels.

SUMMARY OF THE INVENTION

As shown in FIG. 1, a differential limiting force control system according to the present invention comprises sensor means 1, controller means 2 and differential limiting clutch means 3. The clutch means is disposed between right and left drive wheels of a vehicle for varying a differential limiting force in accordance with a control signal. The sensor means comprises first sensing means 101 for determining a turning radius of the vehicle, and second sensing means 102 for sensing a centripetal acceleration of the vehicle. The controller means 2 produces the control signal in accordance with signals supplied from the sensor means 1. The controller means 2 is arranged to determine a command magnitude which increases as the turning radius increases and which increases as the centripetal acceleration increases. The command magnitude is represented by the control signal, and corresponds to the differential limiting force.

When the vehicle is in a straight ahead movement of a low or medium vehicle speed, the turning radius is infinite, and the controller means 2 maximizes the differential limiting force by increasing the command magnitude to a maximum. Therefore, the control system according to the present invention enables the vehicle to safely negotiate a split mu road by increasing the differential limiting force. Thus, the present invention improve the vehicle's ability of negotiating adverse road conditions.

At an early stage of a turn at low or medium vehicle speeds, the turning radius is decreased with angular displacement of the steering wheel from a straight ahead position, and accordingly, the controller means 2 decreases the command magnitude toward zero. In this case, the centripetal acceleration remains within a low and medium range. Thus, the control system of the present invention decreases the understeer tendency.

At a late stage of a low or medium speed turn, the centripetal acceleration increases while the turning radius is held approximately constant. Therefore, the controller means 2 increases the command magnitude again, and improve the traction ability during a turn by preventing inside wheel spin and providing sufficient driving torque.

The turning radius is infinite in a high speed straight ahead operation, and the centripetal acceleration is very high in a high speed cornering operation. Therefore, the controller means 2 improve the stability of the vehicle at high speeds by increasing the differential limiting force.

DETAILED DESCRIPTION OF THE INVENTION

Figure 1:
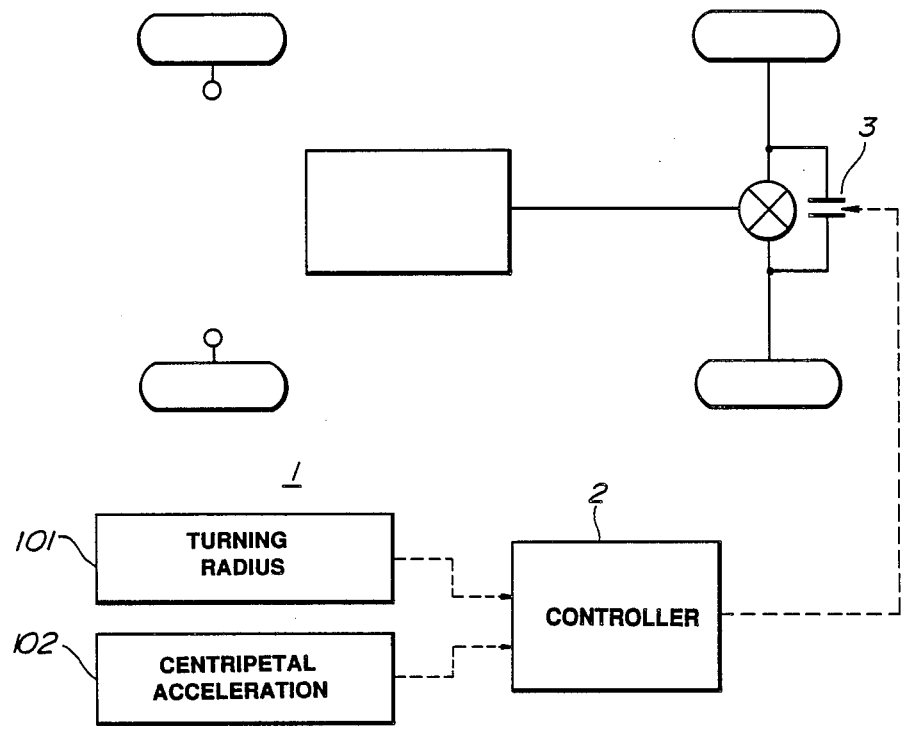
FIG. 1 a schematic view showing a basic arrangement of a differential limiting force control system according to the present invention.
Figure 2:
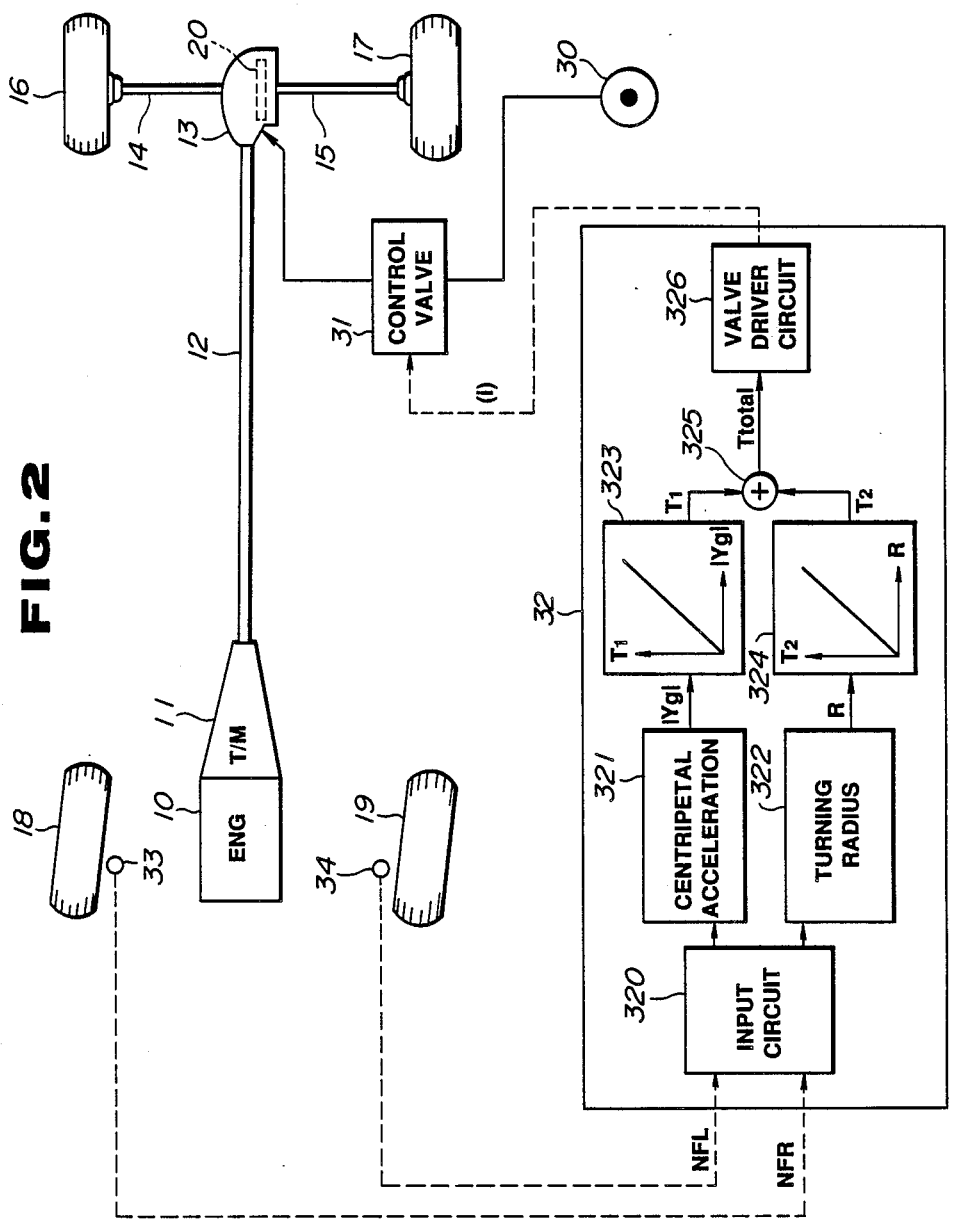
FIG. 2 is a schematic view of a rear wheel drive vehicle equipped with a differential limiting force control system of one embodiment of the invention.
Figure 3:
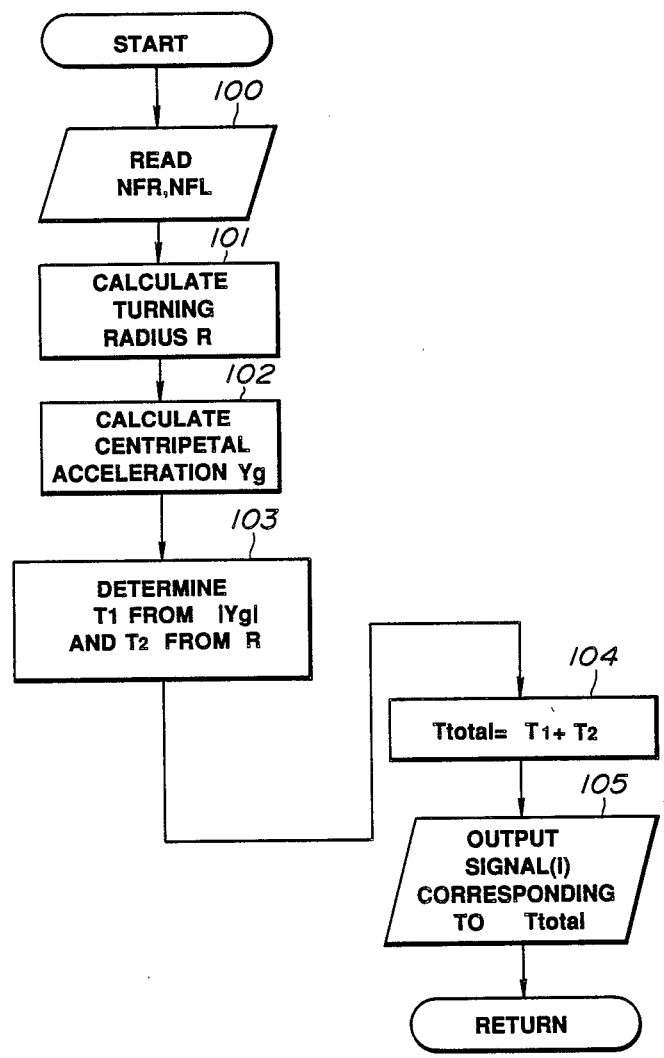
FIG. 3 is a flowchart showing a control process performed by a controller of the control system of the embodiment.
Figure 4:
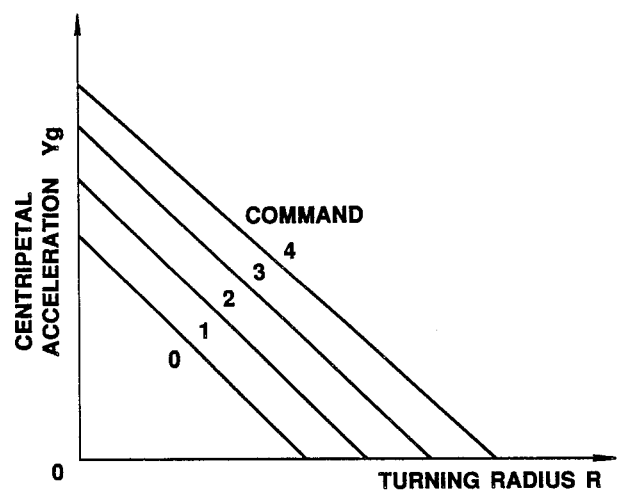
FIG. 4 is a graph showing a characteristic of a command magnitude, employed in the embodiment.

One embodiment of the present invention is shown in FIGS. 2-4.

As shown in FIG. 2, a vehicle of this embodiment is a rear wheel drive vehicle. The vehicle includes an engine 10, a transmission 11, a propeller shaft 12, a differential 13, right and left drive shafts 14 and 15, right and left rear wheels 16 and 17, and right and left front wheels 18 and 19.

The differential 13 includes a differential limiting clutch 20. In this embodiment, the differential limiting clutch 20 is a multiple disc wet type friction clutch. An external oil pressure source 30 is connected through a control valve 31 to the differential limiting clutch 20. The control valve 31 is capable of varying an engagement force of the differential limiting clutch 20 by varying an oil pressure supplied to the clutch 20 in response to a control signal (i). A differential limiting force T between the right and left rear wheels 16 and 17 is controlled by varying the engagement force of the differential limiting clutch 20.

A sensor 33 is disposed near the front right wheel 18 for sensing a front right wheel rotational speed NFR. A sensor 34 is disposed near the front left wheel 19 for sensing a front left wheel rotational speed NFL.

A controller 32 is an electronic control circuit for controlling the differential limiting force by producing the control signal (i). The controller 32 is arranged to perform functions shown in FIG. 2. The controller 32 has an input circuit 320 for receiving the signals from the front wheel speed sensors 33 and 34, a section 321 for calculating a centripetal acceleration Yg, a section 322 for calculating a turning radius R of the vehicle, a first function generator 323 for producing a first command signal representing a first command magnitude $T_1$ which increases as the absolute value of the centripetal acceleration Yg increases, a second function generator 324 for producing a second command signal representing a second command magnitude $T_2$ which increases as the turning radius R increases, an adder 325 for determining a total command magnitude Ttotal by adding the first and second command magnitudes $T_1$ and $T_2$ ($T=T_1+T_2$), and a valve driver circuit 326 for producing the control signal (i) corresponding to the total command magnitude Ttotal. The controller 32 delivers the control signal (i) to the control valve 31.

The control valve 31 increases the differential limiting force, that is the clutch engagement force of the differential limiting clutch 20, as the total command magnitude Ttotal increases, and decreases the differential limiting force as Ttotal decreases.

FIG. 3 is a flowchart showing a control process performed by the controller 32.

At a step 100, the controller 32 reads the front right wheel speed NFR and the front left wheel speed NFL sensed by the sensors 33 and 34.

Then, the controller 32 calculates the turning radius R at a step 101, and calculates the centripetal acceleration Yg at a step 102, by using the front right wheel speed NFR and the front left wheel speed NFL. The turning radius R and the centripetal acceleration Yg are obtained by using the following equations.

$$V=\{(NFL+NFR)/2\}/r$$

$$\dot{\lambda}=K1\cdot|NFL-NFR|$$

$$R=V/\dot{\lambda}=K2\cdot|(NFL+NFR)/(NFL-NFR)$$

$$Yg=V^2/R=K3\cdot|(NFL+NFR)\times(NFL-NFR)|$$

In these equations, V is a vehicle speed, $\dot{\lambda}$ is a yaw rate of the vehicle, K1,K2 and K3 are proportional constants which are determined by the specifications of the vehicle, and r is a tire radius.

At a step 103, the controller 32 determines the first command magnitude $T_1$ from the centripetal acceleration Yg obtained at the step 102, and determines the second command magnitude $T_2$ from the turning radius R obtained at the step 101. The first command magnitude $T_1$ is determined according to a predertimed characteristic function in which the first command magnitude $T_1$ increases as the absolute value of the centripetal acceleration Yg increases. The second command magnitude $T_2$ is determined according to a predetermined characteristic function in which the second command magnitude $T_2$ increases as the turning radius R increases. In this embodiment, the first command magnitude $T_1$ is proportional to the absolute value of the centripetal acceleration Yg, and the second command magnitude $T_2$ is proportional to the turning radius R.

At a step 104, the controller 32 determines the total command magnitude Ttotal by adding the first command quantity $T_1$ and the second command quantity $T_2$ (Ttotal=$T_1+T_2$).

At a step 105, the controller 32 delivers the control signal (i) representing the total command magnitude T, to the control valve 31. Thus, the engagement force of the differential limiting clutch 20 is controlled so as to obtain the differential limiting force equal to the total command quantity Ttotal.

Figure 5:
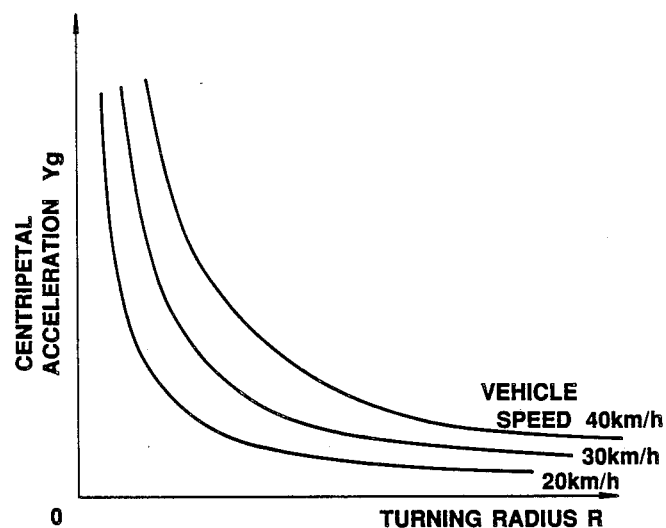
FIG. 5 is a graph showing a characteristic between a centripetal acceleration and a turning radius.

In this way, the controller 32 varies the total command magnitude in accordance with the centripetal acceleration Yg and the turning radius R, as shown in FIG. 4. In a graph of FIG. 5, the turning radius R is expressed along an x-axis, the centripetal acceleration Yg is expressed along a y-axis, and the vehicle speed is taken as a parameter.

The control system is operated as follows:

When the vehicle is in a straight ahead movement of a low or medium vehicle speed: In this case, the turning radius R is infinite because of the straight ahead operation, and accordingly the controller 32 produces the control signal (i) to increase the differential limiting force T to a maximum. Therefore, even on a split mu road having different friction coefficients under the right and left wheels, the control system ensures safe and stable operation by limiting the differential action between the right and left wheels 16 and 17 as in a differential lock state.

When the vehicle is in a turning movement of a low or medium vehicle speed: At an early stage of a turning movement of a low or medium vehicle speed, the turning radius R is decreased as the steering wheel is turned away from the straight ahead position, and the controller 32 produces the control signal (i) to make the differential limiting force T closer to zero, or reduce the differential limiting force T to zero. For example, the total command magnitude Ttotal is decreased toward zero, from 4 to 3, then from 3 to 2, and so on. At this stage, the centripetal acceleration Yg is not high, but remains within a low or medium range. In this way, the control system decreases the tendency to understeer.

At a later stage of the low or medium speed turning movement, the turning radius R is held approximately constant, but the centripetal acceleration Yg increases. Therefore, the control system increases the differential limiting force T again. For example, the total command magnitude Ttotal is increased from zero to 1, from 1 to 2, and so on. At the later stage of a turn, the control system prevents spin of the inside wheel by increasing the differential limiting force, and improve the traction ability during a turn.

When the vehicle speed is high: The turning radius R becomes infinitely great when the vehicle is in a high speed straight ahead movement, and the centripetal acceleration Yg becomes very high when the vehicle is in a turning movement at a high vehicle speed. In either case, the controller 32 makes the differential limiting force high when the vehicle speed is high. For example, the controller 32 produces the control signal (i) corresponding to the total command magnitude equal to 4.

Therefore, the control system ensures vehicle stability against disturbances such as a cross wind during straight ahead high speed operation, with the high differential limiting force. During a high speed turn, the control system increases the tendency to understeer by producing a moment toward understeer with the differential limiting force, so that stable cornering behavior is obtained.

Figure 6:
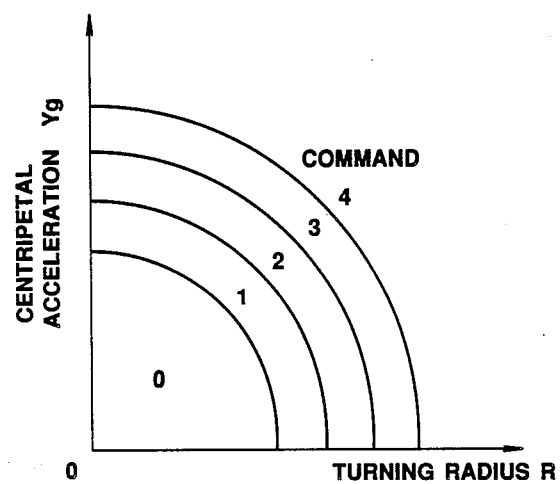
FIG. 6 is a graph showing another characteristic which can employed in place of the characteristic of FIG. 4.
Figure 7:
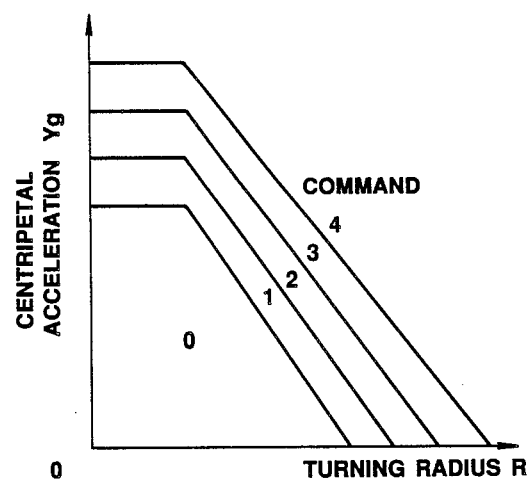
FIG. 7 is a graph showing still another characteristic which can employed.

It is optional to employ a characteristic shown in FIG. 6, or a characteristic shown in FIG. 7, in place of the characteristic shown in FIG. 4. In the case of FIG. 6, the command magnitude is determined by using concentric circles having a common center lying on the origin. For example, the control system is arranged to determine the command magnitude in accordance with the turning radius R and the centripetal acceleration Yg so that the command magnitude is increased in proportion to a distance in a two dimentional coordinate system, from a predetermined fixed point, such as the origin, to a point whose x coordinate is equal to a value obtained by multiplying the turning radius by a predetermined constant, and whose y coordinate is equal to a value obtained by multiplying the centripetal acceleration by a predetermined constant. With the characteristic of FIG. 6, the control system can prevent the command maginitude from being increased by the vehicle speed when the vehicle speed is low or medium and the centripetal acceleration Yg is high. Similar effects are obtained by employing the characteristic of FIG. 7. In the characteristic of FIG. 7, each line is flat in a region in which the turning radius R is small, and the centripetal acceleration Yg is high.

It is possible to determine the turning radius from a steering angle by using a sensor for sensing the steering angle, instead of the turning radius sensing means of this embodiment. Furthermore, it is possible to determine the centripetal acceleration by using a sensor directly sensing the centripetal acceleration. Alternatively, it is possible to calculate the centripetal acceleration from the vehicle speed and the turning radius.

What is claimed is:

1. A differential limiting force control system comprising:

clutch means disposed between right and left drive wheels of a vehicle for varying a differential limiting force between said right and left drive wheels in accordance with a control signal, sensor means for determining a turning radius of said vehicle and for determining a centripetal acceleration of said vehicle, and controller means for producing said control signal in accordance with signals sent from said sensor means, said controller means determining a command magnitude which increases as said turning radius increases, and which increases as said centripetal acceleration increases.

2. A control system according to claim 1 wherein said controller means comprises first function generating means for determining a first command signal whose magnitude increases as an absolute value of said centripetal acceleration increases, and second function generating means for producing a second command signal whose magnitude increases as said turning radius increases.

3. A control system according to claim 2 wherein said controller means further comprises adding means for generating said command magnitude by adding said first and second command signals.

4. A control system according to claim 3 wherein said adding means determines an arithmetic sum of said magnitudes of said first and second command signals.

5. A control system according to claim 3 wherein a magnitude of said first command signal is proportional to an absolute value of said centripetal acceleration, and a magnitude of said second command signal is proportional to said turning radius.

6. A control system according to claim 5 wherein said sensor means comprises a front right wheel speed sensor sensing a front right wheel rotational speed, and a front left wheel speed sensor sensing a front left wheel rotational speed, first calculating means for calculating said centripetal acceleration utilizing said front right wheel rotational speed and said front left wheel rotational speed, and second calculating means for calculating said turning radius utilizing said front right wheel rotational speed and said front left wheel rotational speed.

7. A control system according to claim 6 wherein said drive wheels include rear wheels of said vehicle.

8. A control system according to claim 1 wherein said command magnitude is represented by said control signal and said command magnitude assumes a plurality of values which comprise first, second and third distinct values.

9. A control system according to claim 1 wherein said controller means gradually increases said differential limiting force as turning radius increases, and as a centripetal acceleration increases.

* * * * *